(12) United States Patent
Forster

(10) Patent No.: US 8,128,000 B2
(45) Date of Patent: Mar. 6, 2012

(54) METHOD, SYSTEM AND APPARATUS FOR MANUFACTURING A RADIO FREQUENCY IDENTIFICATION DEVICE

(75) Inventor: Ian J. Forster, Essex (GB)

(73) Assignee: Avery Dennison Corporation, Pasadena, CA (US)

( * ) Notice: Subject to any disclaimer, the term of this patent is extended or adjusted under 35 U.S.C. 154(b) by 124 days.

(21) Appl. No.: 12/566,719

(22) Filed: Sep. 25, 2009

(65) Prior Publication Data

US 2011/0073661 A1    Mar. 31, 2011

(51) Int. Cl.
    *G06K 19/05* (2006.01)
(52) U.S. Cl. .......................... 235/492; 235/487
(58) Field of Classification Search ............... 235/492, 235/487, 441, 462.13, 462.46, 472.02
    See application file for complete search history.

(56) References Cited

U.S. PATENT DOCUMENTS

| | | | |
|---|---|---|---|
| 5,645,923 A | 7/1997 | Matsuo et al. | |
| 6,618,939 B2 | 9/2003 | Uchibori et al. | |
| 7,202,790 B2 | 4/2007 | Copeland et al. | |
| 7,579,950 B2 * | 8/2009 | Lerch et al. | 340/568.2 |
| 7,646,304 B2 * | 1/2010 | Cote et al. | 340/572.7 |
| 2007/0012775 A1 | 1/2007 | Cote | |
| 2007/0171129 A1 | 7/2007 | Coleman et al. | |
| 2007/0238245 A1 * | 10/2007 | Cote et al. | 438/243 |
| 2008/0068280 A1 | 3/2008 | Koenig et al. | |

* cited by examiner

*Primary Examiner* — Daniel St Cyr
(74) *Attorney, Agent, or Firm* — Avery Dennison Corporation

(57) ABSTRACT

A method, system and apparatus for manufacturing radio frequency identification (RFID) devices. An RFID device can be formed with a substrate, a conductor and a laminate or coating. The RFID device can be such that an antenna can be formed on the conductor and the laminate can be applied to insulate or protect the antenna.

20 Claims, 5 Drawing Sheets

METHOD, SYSTEM AND APPARATUS FOR MANUFACTURING A RADIO FREQUENCY IDENTIFICATION DEVICE

FIELD OF THE INVENTION

The present invention is in the field of manufacturing radio frequency identification (RFID) devices. More particularly the invention is directed to cutting, tuning and printing a RFID device in a continuous and efficient manner which does not require the removal of the waste matrix or scrap material from the antenna coils.

BACKGROUND OF THE INVENTION

The use of radio frequency identification (RFID) to identify one of a plurality of items is well known. Typical radio frequency identification (RFID) tags or integrated circuits include a microprocessor, also known as a microchip, electrically connected to an antenna. Alternatively, the microchip is first attached to a pad having electrical leads that provides a larger attachment of "landing" area. This is typically referred to as a "strap" or "interposer." The strap is then attached to the antenna.

The microprocessor stores data, which can include identifying data unique to a specific item, which is transmitted to an external receiver for reading by an operator and processing of the item. RFID tags can be attached to items for inventory control, shipment control, and the like. RFID tags are particularly useful in identifying, tracking and controlling items such as packages, pallets, and other product containers. The location of each item can be tracked and information identifying the owner of the item or specific handling requirements can be encoded into the RFID and later read by a scanning device capable of decoding and displaying the information.

Many of the processes used to make RFID tags involve applying a material, typically a conductor such as copper, aluminum or an ink containing silver in a binder, to a substrate and then forming it into a desired antenna shape. Typically, any material that remains on the substrate after the antenna shape is formed is then removed or pulled off using any of a variety of techniques, such a process is known as matrix or scrap removal. The material is removed such that the antenna does not short itself out. For example, in etching, the pattern is defined by an etch resist material and the unwanted conductor is dissolved using chemicals. Another such method is die cutting as described in co-pending application US 2007/0171129, filed Jan. 24, 2006 and entitled "Radio Frequency (RF) Antenna Containing Element and Methods of Making the Same" (assigned to the same assignee—Avery Dennison Corporation—as the present application) which is hereby incorporated by reference herein as is necessary for a complete understanding of the present invention. However, for a variety of RFID end use designs and applications, the antenna can be complex, intricate and delicate, for example varying in size and shape, and having different properties depending on the material from which it is formed. Thus, conventional die cutting following the formation of an RFID device, where a portion of the material is pulled out of a web, are unsuitable for spiral coils and designs requiring small gaps as the material to be pulled out (matrix) is too complex or thin in sections and will break if pulled. In addition, portions of the material that are intended to be removed may not be attached to the larger matrix and as such may not be removed completely during a die cutting operation thus creating a short in the device.

BRIEF SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Exemplary embodiments describe methods and apparatuses for forming RFID devices. One example can include the formation of an antenna. This method can include steps for mounting a conductor on a substrate; cutting through the conductor to form a coil and without removing the matrix; and laminating or coating the coil. The method of the present invention is particularly suitable for creating "on-demand" antennas for short run or small batch operations where unique RFID devices may be required. In this fashion, a small company can produce or alter existing antenna designs in order to create a particular RFID device for the application.

Another exemplary embodiment can include a method for making an RFID tag. This method can include steps for mounting a conductor on a substrate; cutting through the conductor to form a coil, without removing the matrix; laminating, oxidizing or coating the coil to create a barrier to prevent shorting; and coupling a microchip to the coil.

Still another exemplary embodiment can describe an RFID tag. The RFID tag can have a conductive layer coupled to a substrate; an antenna coil cut into the conductive layer, with the matrix remaining substantially in position, the antenna coil having a plurality of edges defined therein; a laminate or coating disposed over the coil and between each of the plurality of edges of the coil to prevent shorting of the circuit; and a chip disposed on the coil.

In yet a still further embodiment, a method is provided in which a material (laminate or coating) is provided over the conductive substrate. The material can be heated so as to flow into the areas removed by the cutting or pressed into the surface of the coil to thus prevent shorting of the antenna. Alternatively, the laminate or liquid can be applied after the die cutting step or as part of the printing step, which will flow into the areas vacated by the cutting to prevent shorting of the antenna. In addition, an oxidizing material can be provided to create an oxidized barrier on the cut edges of the antenna.

BRIEF DESCRIPTION OF THE FIGURES

Advantages of embodiments of the present invention will be apparent from the following detailed description of the exemplary embodiments thereof, which description should be considered in conjunction with the accompanying drawings in which.

DETAILED DESCRIPTION OF THE INVENTION

Aspects of the invention are disclosed in the following description and related drawings directed to specific embodiments of the invention. Alternate embodiments can be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Generally referring to FIGS. 1 through 8, various types of RFID components can be described, as well as various manners of manufacturing RFID components and devices. Exemplary embodiments can include methods for manufacturing RFID antennal coils. These methods can allow for a decrease in the cost of manufacturing RFID devices.

Figure 1:
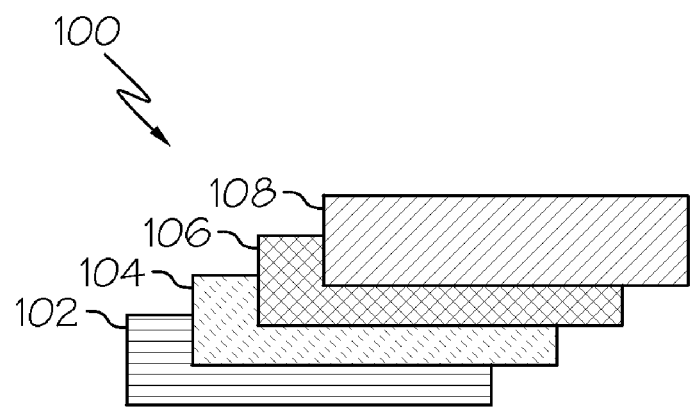
FIG. 1 is an exemplary exploded view of an RFID device.

FIG. 1 provides an exemplary view of an RFID device 100 that can have a variety of components. In one exemplary embodiment, a substrate 102 can have a conductor 106 mounted thereon. The conductor 106 can be any of a variety of materials, for example aluminum, copper, silver or another thin, conductive material, for example etched or hot-stamped metal foil. The substrate 102 can be any material, for example paper, coated paper, plastic, e.g. polyethylene terephthalate (PET), laminations of film and paper or any other suitable substrate that can be desired. Additionally, the conductor 106 can be mounted on the substrate 102 through the use of an adhesive 104 or other suitable processes as thermal bonding, ultrasonic bonding or the like. The adhesive 104 used to mount the conductor 106 on the substrate 102 can be such that a coupling is achieved between the conductor 106 and the substrate 102. Additionally, the adhesive 104 can be applied in any suitable manner, for example, pattern coating, transfer tape application or the like. Also, in some further exemplary embodiments, the adhesive 104 can be substantially similar to a laminate.

Still referring to FIG. 1, a tool (not pictured) can then be used to cut the conductor 106. The tool used to cut the conductor 106 can be any cutting tool known in the art that can cut a conductor 106 into a desired shape, for example an RFID coil. In some exemplary embodiments a die cutting tool can be utilized. In other exemplary embodiments, a knife, such as a self castering knife, can be used to cut the conductor 106. Further, a self castering knife can be coupled with a printer having a cross web drive to form any desired size or shape on the conductor 106. For example, the tool can be a tool having a spiral shape that can cut through the conductor 106 or it can be a tool that is able to cut desired portions of the conductor 106 as the device 100 is moved along an axis. The cutting tool forms a gap between the various windings of the antenna so that the conductive material that has been separated will not be in contact with the windings. The pressure or other forces applied by the cutting tool forces the conductive material apart to form the gap.

Figure 2:
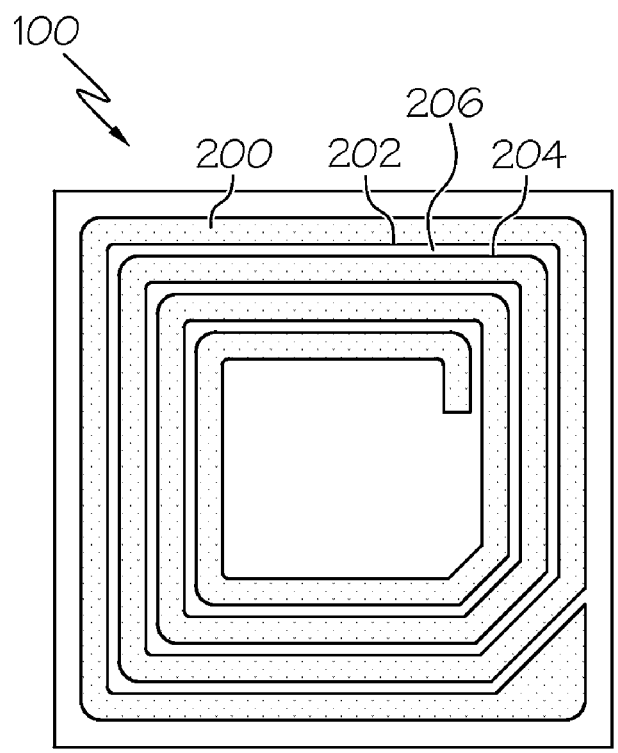
FIG. 2 is an exemplary view of a coil.
Figure 3:
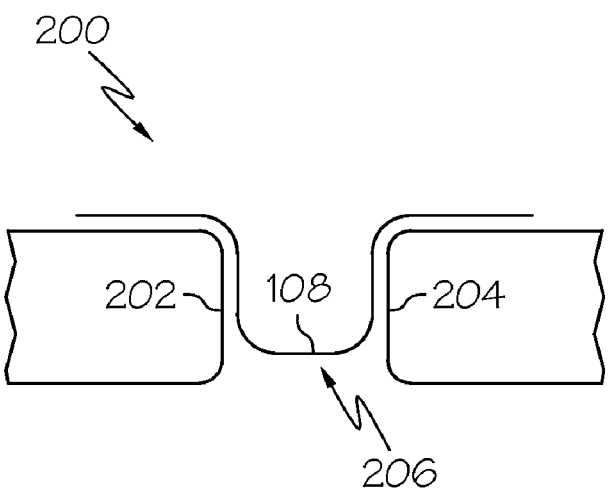
FIG. 3 is another exemplary perspective view of edges of a coil.

After the conductor 106 is cut with the tool, a coil, for example coil 200 shown in exemplary FIG. 2 can be formed that can include one or more gaps, areas created by the cutting, between its edges, for example the gap 206 between edge 202 and edge 204. The gaps between any edges of coil 200 can be formed as a result of the cutting of the conductor 106 and can be maintained throughout the formation of, for example, an RFID device. The gaps are created by the die cutting process. In some further exemplary embodiments, the conductor 106 can be cut so that any coil formed can be formed in a predetermined or pre-selected configuration that can be suitable for receiving and transmitting radio frequency signals over a pre-selected distance. The scrap material or matrix remains with the substrate and is not removed.

Referring back to FIG. 1, after forming the coil 200 with conductor 106, a laminate or other coating 108 can be applied over the coil. The laminate or coating 108 can be any of a variety of laminates or coatings, for example a UV curable liquid, resin, deformable film, oxidizing agent, etc. depending on the desired use or environment of a device that can utilize the coil. For example, the laminate or coating 108 can be such that it can be compatible with attachment of a chip or any other desired component. The laminate or coating 108 can be applied in any of a variety of methods, for example by a non-contact method such as spraying, curtain coating, printing, in-line application and the like. Additionally, the laminate or coating 108 can be transparent or translucent or colored to match a product or company or customer trade dress or to conceal the RFID device on the product packaging. In some further exemplary embodiments, the laminate or coating 108 can be waterproof and can act to seal any component from outside elements and contamination. Further, the laminate or coating 108 can be used to over-laminate or over coat the coil 200 as well as to the seal substrate 102, coil 200 and the adhesive 104.

In a further exemplary embodiment, the laminate or coating 108 used in the over-lamination or coating of the coil 200 can be can be applied either before or after the cutting or simultaneously with printing or after the printing step. Thus, the material of the laminate or coating 108 can be disposed in any gaps located between coil edges. For example, after the conductor 106 was cut to form the coil 200 shown in FIG. 2, there can be gaps, for example the gap 206, disposed in areas directly between any of the edges of the antenna portion, for example the edges 202 and 204, of the coil 200. The gaps can be of any length that can separate one edge of the coil 200 from another coil edge. Additionally, the gaps can include an area that is depressed, or otherwise disposed at a different level, from the coil 200. It is important to remember that in the practice of the present invention, the matrix material is not removed and remains with the antenna coil. The gaps created between the windings of the coil are created through the cutting process and not through the removal of the scrap or excess material.

In a further alternate arrangement, the coating material can be an oxidizing agent that may be used to create a protective barrier, such as in the case of an aluminum antenna coil and the oxidizing agent can create a protective barrier of $Al_2O_3$. The oxidizing agent would be applied similarly as the coating or the laminate and would oxidize the exposed edges of the coil windings to form the insulating barrier to prevent shorting of the device.

Following the over-lamination or over coating of the coil, the gaps can have any amount of the laminate or coating 108 disposed therein. As shown in the exemplary close-up view in FIG. 3, the coil 200 can have any number of edges, for example the edge 202 and the edge 204. Between the edge 202 and the edge 204 there can be a gap, such as the gap 206 that substantially divides the edge 202 from the edge 206. The gap 206 can be such that there is little or no material contact between edge 202 and edge 204, such as material contact that can result from remnants of the conductor 106 after it is cut. In various exemplary embodiments, different techniques can be used to apply the laminate or coating 108 to the coil so as to achieve a desired amount of the laminate or coating 108 located between any edges of the coil. As discussed previously, the laminate or coating 108 can be applied as a liquid or in another form, such as a deformable film, and can be have further force applied to displace the material between the edges 202 and 204 and into the gaps created by the cutting. Additionally, depending on how the conductor 106 is cut to form the coil 200, any amount of the laminate or coating 108 can be used to fill any desired gaps between any edges of the coil. In some exemplary embodiments, the amount of the laminate or coating 108 used to fill the gap 206 can be such that the laminate or coating 108 is disposed from a substantially bottom portion of the gap 206 to a substantially top portion of the gap 206. Further, the laminate or coating 108 can be used to laminate or coat any material or component on a top portion or a bottom portion of coil 200 or the substrate 102 to which the coil 200 can be coupled.

In still other exemplary embodiments, the laminate 108 can be applied as a liquid. This type of application can allow for the laminate or coating 108 to flow over the conductor 106 and fill any gaps. After a desired amount of the laminate or coating 108 has been applied to the conductor 106, the laminate or coating 108 can be allowed to dry or can otherwise be converted into a solid or a high viscosity material. A conversion of the laminate or coating 108 from a liquid to a solid or a high viscosity material can be accomplished through the application of irradiation to the laminate or coating 108 or through the application of heat to the laminate or coating 108.

In yet another exemplary embodiment, a laminate or coating 108 can be applied over the conductor 106 and the substrate 102 prior to a cutting, for example a die cutting, of the conductor 106. In this exemplary embodiment, the laminate or coating 108, which can be a solid or high viscosity material, can be pattern printed, or otherwise disposed, onto the substrate 102 and the conductor 106 that are to be cut. The RFID device 100 can then be cut, for example by die cutting, so that the desired pattern is formed on the conductor 106. Following the cut, heat or irradiation can be applied to the RFID device 100. The application of heat can cause a reduction in the viscosity of the laminate or coating 108, which can allow the laminate or coating 108 to flow and fill any gaps, for example cut gaps, between the pattern cut on the RFID device 100. The laminate or coating 108 can then be cooled or cured.

In a further exemplary embodiment, following the cutting of the conductor 106 and the over-lamination or over coating of the coil 200, it can be unnecessary to strip away any unused conductive material on the substrate 102. For example, if the conductor 106 is cut into a coil and if the coil 200 is formed so as to have gaps, such as gap 206, disposed between edges of the coil 200, the coil 200 can be insulated and a spiral inductor can be formed there from. Any remaining portions of elements of the conductor 106 could have been cut through by the cutting tool and could have been disposed in any gaps located between edges of the coil. Therefore, following the over-lamination or over coating of the coil 200, any remaining portions or elements of the conductor 106 that might remain present following the cutting and over-lamination or over coating can be substantially removed and isolated by the laminate or coating 108 applied thereto.

In some exemplary embodiments, the cutting of the conductor 106 and the over-laminating or over coating of the coil formed thereby can allow for the rapid and inexpensive production of an RFID antenna as the matrix or scrap material does not have to be removed from the antenna windings. For example, as it can optionally no longer be desired to strip away any unused material from the conductor 106 that can be adhered to the substrate 102, tools for stripping away the unused conductive material or matrix can be eliminated and the time it can take to strip away the unused conductive material can be saved, not to mention the damage that can be done to the device if material is inadvertently removed or portions of the material remain behind and short out the circuit. Similarly, the costs associated with the stripping away of unused conductive material can be saved and the formation of the coil and any associated RFID device can be less expensive than other known manners or techniques used in forming RFID devices, for example, etching. Additionally, more complex or intricate coil shapes can be formed as the cutting and over-laminating or over coating methodology described herein can prevent any undesired tearing or breakage of the coil that can occur using other methodologies.

In a still further exemplary embodiment, and as discussed previously, a spiral inductor can be formed from coil 200 without the need or desire to remove any of the conductor 106 after the coil 200 is formed. The spiral inductor can then be resonated with a parallel plate capacitor structure. The resonation of the spiral inductor can be used to form a high frequency (HF) electronic article surveillance (EAS) device, for example about 8.2 MHz, or any other desired or suitable frequency, EAS device.

Figure 4:
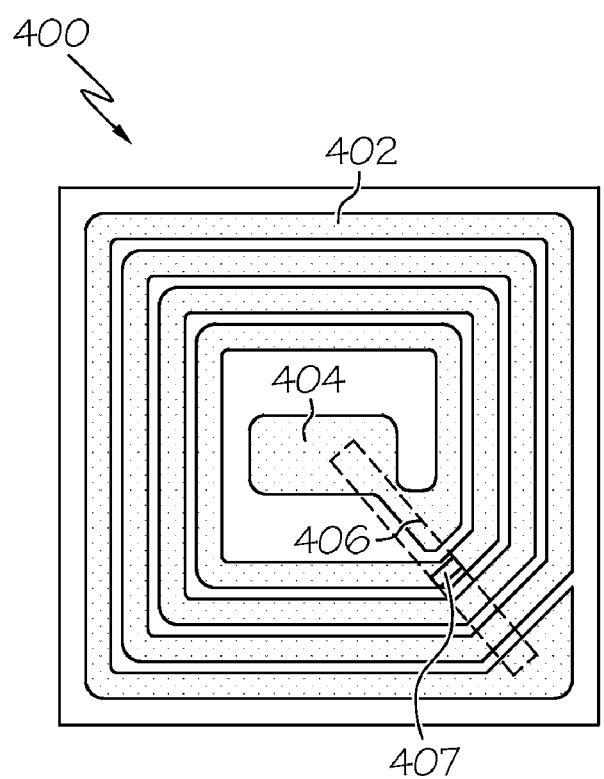
FIG. 4 is an exemplary view of an RFID device.

As shown in exemplary FIG. 4, an RFID tag 400 can be formed on substrate 102. For example, following the formation of a spiral inductor 402 and its resonation with a parallel plate capacitor structure 404, a strap 406 (shown in phantom) can be applied carrying a suitable RFID device and can be connected between a middle portion of the inductor 404 and an outer edge of the inductor 402 to alter the frequency of the RFID tag 400. Also, the strap 406 can include any desired RFID device, for example a microchip 407, a microprocessor, an interposer or any similar device known to one having ordinary skill in the art adapted for attachment to an antenna, coil or inductor. For example the strap 406 coupled to the inductor 402 can have data storage, processing, transmitting and receiving capabilities and specifications suitable for the purposes described herein. In a further exemplary embodiment, if the strap 406 is connected to the middle of the inductor 404 and the outer edge of the inductor 402, an RFID tag 400 can be formed with a frequency of about 13.56 MHz or any other frequency known or desired. The strap 406 can be cooperatively disposed with the antenna through antenna contacts.

In a further exemplary embodiment, a gap, for example gap 206, formed by a cut made by the cutting tool in the conductor 106, can be used as a distributed capacitor. The distributed capacitor can be used in a structure that can prevent DC contact across an RFID device. Further, the distributed capacitor can be able to prevent DC contact across an RFID device while also allowing high frequencies to flow with a minimal loss. Additionally, circuits having functionality other than the receipt and transmission of radio frequency signals can be utilized with the embodiments as described herein.

Figure 5:
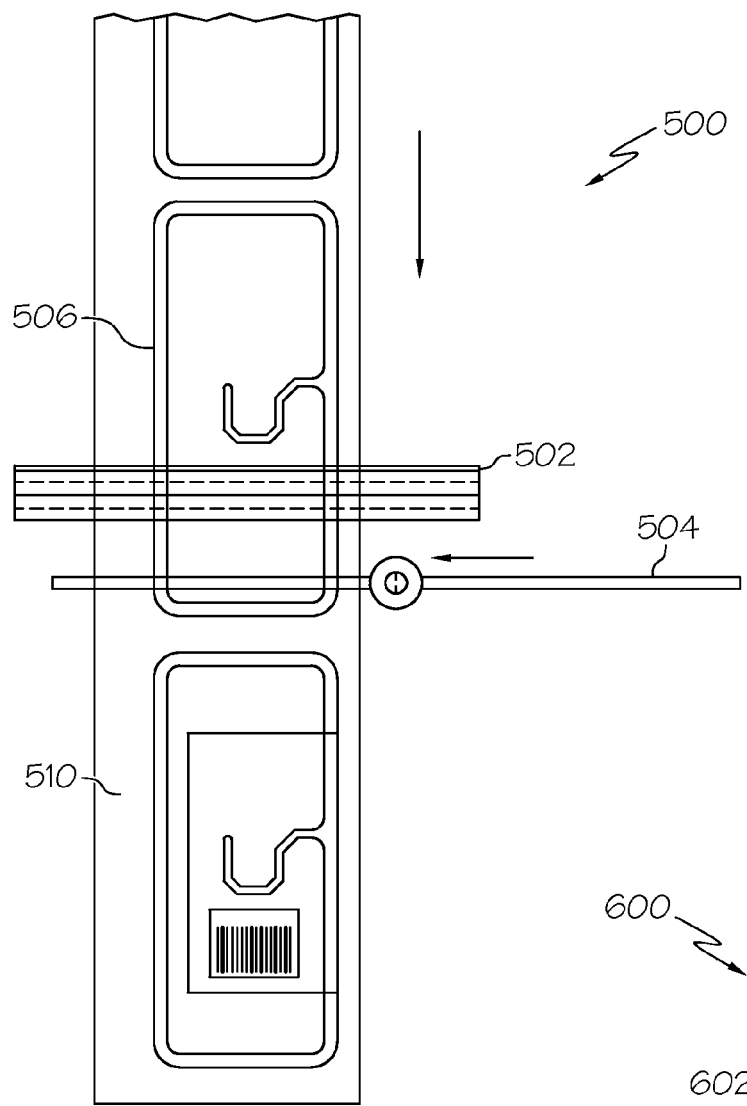
FIG. 5 is an exemplary view showing the formation of an RFID label.

In another exemplary embodiment, and as shown in FIG. 5, a method and apparatus of converting, tuning and printing RFID devices on demand is described. For example, an RFID device can be printed and tuned using a single printing and cutting device, for example printing mechanism 500. In this example, and as described further below with respect to FIG. 5, a cutting device can be added to a printer or a printer having a cutting device can be modified. The cutting device can be a knife, for example a self-castering knife, a rotation drive blade or any other cutting implement known to one having ordinary skill in the art. The cutting device is used to form the RFID device as described in FIGS. 1 through 4 above. Further, the knife can be coupled to the printer in such a fashion as it can move on a single plane, for example cross web or X direction (e.g. at a 90 degree angle to any material which is being printed on), as the printer moves any number of labels or other material in the Y direction.

As shown in exemplary FIG. 5, and on demand system is presented and includes a printing mechanism 500 that can have a variety of components. The printing mechanism would be driven by a computer system, such as a desktop or laptop computer in which instructions, software and designs templates for antennas would be entered and transmitted to the printing mechanism 500 for implementation. The computer system will have a series of designs available for the operator or alternatively will enable via software the operator to design a particular antenna and/or coil for subsequent production.

The printing mechanism includes a print head 502 that can be positioned over a drive belt or web 510 or other means that can move a web material to be printed, or the carrier web or release liner itself would serve as the mechanism for advancing the labels 506 through the printer 500. As a single label 506 moves down the print line of mechanism 500, any desired indicia can be printed thereon by print head 502, e.g. human and machine readable indicia. Further, as described in previous exemplary embodiments, the label 502 can have a laminate or coating disposed thereon which can function in any manner described herein. After the label 502 is printed, it can move under cutting device 504. In some exemplary embodiments, the label 506 can pause briefly to allow for a cut, for example a horizontal cut, to be made. In some further exemplary embodiments, the label can pause for about 0.5 ms, during which it can be cut. This cut made by the cutting device 504 can be such that an antenna is formed on the label 506. The system would thus allow for a specific or unique antenna design for an RFID device to be produced in very small quantities, even a single device.

In a further exemplary embodiment, after the label 506 is initially cut, the label 506 can be printed and the cutting device 504 can continue to cut as the label 506 advances through printing mechanism 500. The cutting device 504 can later make a horizontal cut at one end of the label 506 to define the label. Further, in some alternative embodiments, the cutting device 504 can carry a marker (not shown) that can show an outline of the label 506 to be placed if desired. Thus, by cutting both an X (horizontal) direction and a Y (vertical) direction of an antenna, the label 506 can be tuned for the product onto which it can be placed. The tuning of the RFID label 506 can be performed for any reason, for example to achieve a desired performance based upon a database of products and any dimensions of the products to which the label 506 maybe coupled.

Figure 6:
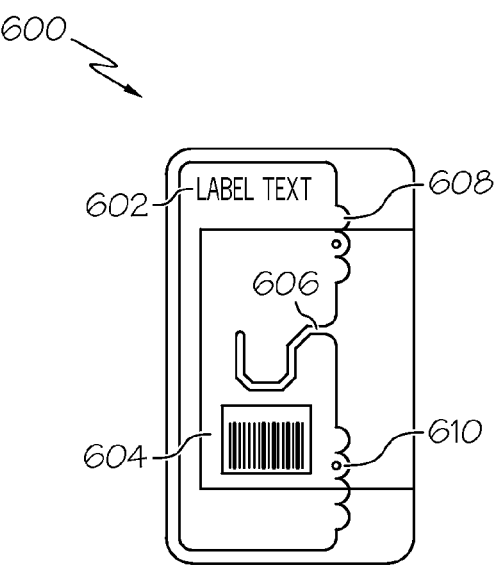
FIG. 6 is an exemplary view of an RFID label with a scalloped edge.

In another exemplary embodiment as shown in FIG. 6, a label 600 can be cut in any of a variety of formats. Here, the label 600 can be seen with printed indicia 602 and 604 as well as antenna 606. Additionally, the label 600 can be cut so as to have a scalloped edge 608. The scalloped edge 608 can include any of a number of tabs 610, which can be used as adhesive free pull tabs. The tabs 610 can be formed with no adhesive printed or otherwise disposed there under, which can allow for ease of detachment of a desired section of label 600 for coupling with a product.

Figure 7:
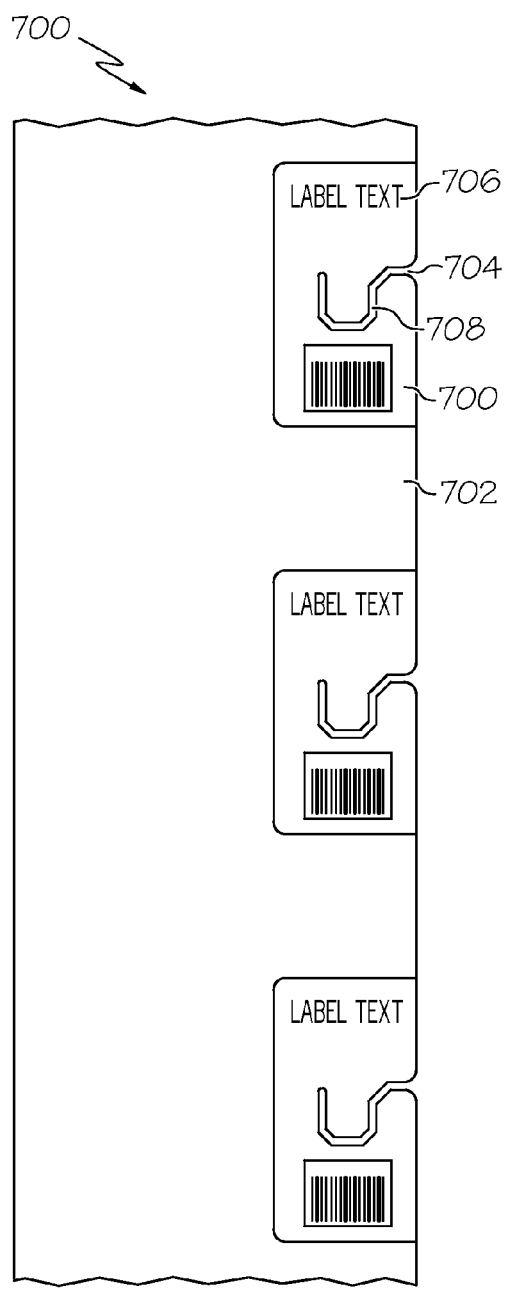
FIG. 7 an exemplary view showing a web used for the formation of RFID labels.
Figure 8:
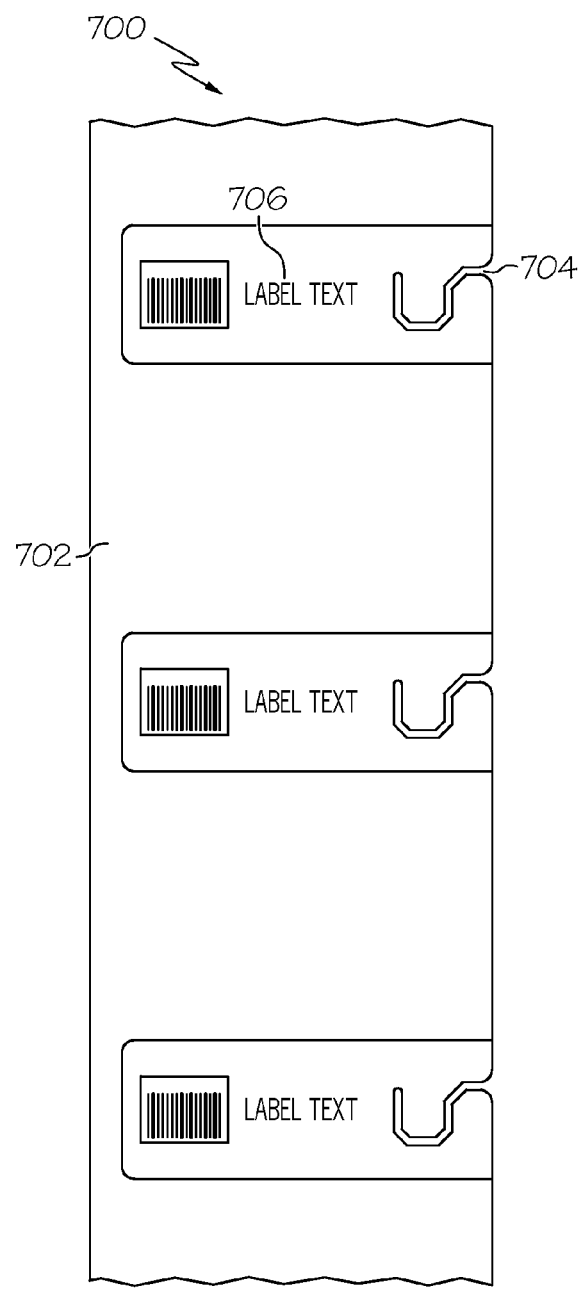
FIG. 8 is another exemplary view showing a web used for the formation of RFID labels.

In yet another exemplary embodiment, and shown in FIGS. 7 and 8, any number of labels can be printed and cut from the same web. For example, a strip of conductive material, for example aluminum can be used as a web 702. The web 702 can include any number of apertures, for example sloop apertures 704, disposed on the web 702. Additionally, straps (not pictured) can be attached to the sloop apertures 704 and the web 702 can optionally be covered in a printable facestock 706. As the labels 700 move through a printing mechanism, a label 700 can be printed and the antenna 708 can be tuned. For example, tuning can be achieved through any desired variation or combination of cut size, such as varying the cut of the conductive material of the label with respect to the position of the aperture slot 704. In this manner, labels can be printed in a variety of orientations, including the substantially lengthwise view shown in exemplary FIG. 7 and the exemplary widthwise view shown in exemplary FIG. 7 and FIG. 8.

Figure 9:
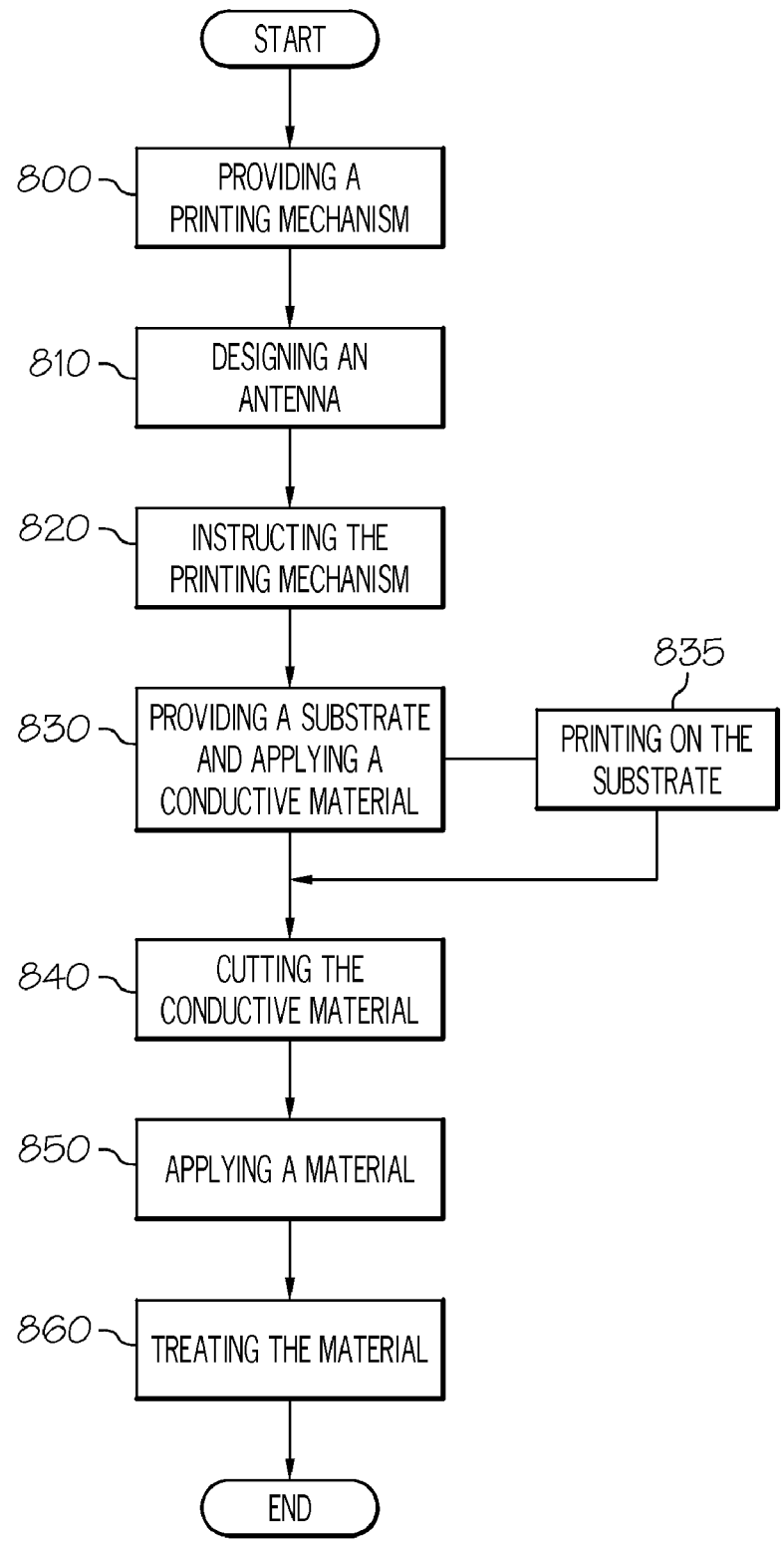
FIG. 9 is a block diagram of an exemplary method of using the system to manufacture the RFID labels.

Reference is now directed to FIG. 9 which is a block diagram that shows a method for using the system to produce the RFID device of the present invention. The process is started at step 800 by providing a printing mechanism that will have a number of components as described in connection with the embodiments of FIGS. 5 through 8. Next, a computer system is used to design an antenna at step 810. The computer system then provides instructions at step 820 to the printing mechanism to begin the process of manufacturing the RFID device. A substrate, such as PET is provided at step 830, the substrate may be printed with human and machine readable indicia at step 835. Conductive material is applied on the substrate and is cut at step 840 to form a coil. Next, a material is applied over the coil at step 850 and the material is treated at step 860. The material flows in to gaps created by the cutting and protects the plurality of edges on the cut portions of the conductive material that form the coil.

It will thus be seen according to the present invention a highly advantageous method of manufacturing RFID devices has been provided. While the invention has been described in connection with what is presently considered to be the most practical and preferred embodiment, it will be apparent to those of ordinary skill in the art that the invention is not to be limited to the disclosed embodiment, and that many modifications and equivalent arrangements may be made thereof within the scope of the invention, which scope is to be accorded the broadest interpretation of the appended claims so as to encompass all equivalent structures and products.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method of making a RFID device having an antenna, comprising:
   providing a substrate;
   mounting a conductor on the substrate;
   cutting through the conductor to form a coil having gaps between windings of an antenna without removing the matrix material from the substrate; and
   applying a material over the gaps to prevent the coil from shorting when connected with an integrated circuit.

2. The method of claim 1, wherein the material is selected from a group including a deformable film, oxidizing agent, adhesive, curable liquid, hardenable liquid or combinations thereof.

3. A method as recited in claim 1, including a further step of printing the substrate after the step of providing the substrate.

4. The method of claim 1, further comprising forcing the material into the gaps formed in the coil after the conductor is cut.

5. The method of claim 1, including a further step of selecting an antenna design prior to the step of providing a substrate.

6. The method of claim 1, wherein the integrated circuit is provided as a strap.

7. The method of claim 1, including a further step of treating the material after the step of applying the material.

8. The method of claim 7, wherein the step of treating includes, heating, irradiating, curing or combinations thereof.

9. The method of claim 7, further comprising insulating the coil by forcing the material between the gaps of the coil.

10. The method of claim 1, including a further step of reducing a viscosity of the material to promote flow of the material after the step of applying the material.

11. The method of claim 1, including a further step of increasing the viscosity of the material to reduce flow of the material after the step of reducing the viscosity.

12. An RFID tag, comprising:
    a substrate;
    a conductive layer coupled to the substrate;
    an antenna coil cut into the conductive layer, the antenna coil having a plurality of edges defined therein, a matrix of the conductive layer remaining with the antenna coil;
    a laminate disposed over the coil and between each of the plurality of edges of the coil to prevent a short in a circuit; and
    a chip disposed on the coil.

13. The RFID tag of claim 12, wherein the conductive layer is selected from a group including aluminum, copper and silver.

14. The RFID tag of claim 12, wherein the laminate disposed between the plurality of edges insulates the coil.

15. The RFID tag as recited in claim 12, wherein the laminate is selected from a group including deformable film, oxidizing agent, adhesive, curable liquid, hardenable liquid or combinations thereof.

16. A method of using a system for producing an RFID device, comprising:
    providing a printing mechanism, the printing mechanism including a computer system having a set of antenna design templates and design software for creating an antenna design;
    designing an antenna for an RFID device;
    instructing the printing mechanism;
    providing a substrate, the substrate having a conductive material applied to a portion of the substrate;
    cutting the conductive material to form the antenna for the RFID device, the antenna having a plurality of edges and between the edges are a series of gaps with a matrix remaining substantially in position; and
    applying a material over the antenna such that the material covers the plurality of edges and fills a portion of the series of gaps.

17. A method as recited in claim 16, including a further step of treating the material after the step of applying the material.

18. A method as recited in claim 17, wherein the step of treating includes, heating, irradiating, curing or combinations thereof.

19. A method as recited in claim 16, including a further step of reducing a viscosity of the material to promote flow of the material after the step of applying the material.

20. A method of making a RFID device having an antenna, comprising:
    providing a substrate;
    mounting a conductor on the substrate;
    cutting through the conductor to form an antenna having gaps between elements of an antenna without removing the matrix material from areas of the substrate; and
    applying a material over the gaps to prevent the antenna elements from shorting or to protect the antenna.

* * * * *